United States Patent [19]
Goto

[11] Patent Number: 5,561,603
[45] Date of Patent: Oct. 1, 1996

[54] VEHICLE REAR WHEEL STEERING ANGLE CONTROLLING APPARATUS HAVING MEANS FOR REDUCING VEHICLE-SPEED-BASED CHANGE IN THE ANGLE, WHEN STEERING WHEEL IS NOT OPERATED

[75] Inventor: Takeshi Goto, Toyota, Japan

[73] Assignee: Toyota Jidosha Kabushiki Kaisha, Toyota, Japan

[21] Appl. No.: 508,339

[22] Filed: Jul. 27, 1995

Related U.S. Application Data

[63] Continuation of Ser. No. 9,014, Jan. 26, 1993, abandoned.

[30] Foreign Application Priority Data

Jan. 29, 1992 [JP] Japan ..................... 4-038513

[51] Int. Cl.$^6$ ................. B62D 6/00; B62D 7/15
[52] U.S. Cl. ......................................... 364/424.05
[58] Field of Search ............... 364/424.05, 550; 180/140, 141, 142; 280/91

[56] References Cited

U.S. PATENT DOCUMENTS

| | | | |
|---|---|---|---|
| 4,679,809 | 7/1987 | Ito et al. | 280/91 |
| 4,930,084 | 5/1990 | Hosaka et al. | 364/426.04 |
| 4,947,327 | 8/1990 | Kawagoe | 364/424.05 |
| 4,949,261 | 8/1990 | Ito et al. | 364/424.05 |
| 5,037,119 | 8/1991 | Takehara et al. | 280/91 |
| 5,224,042 | 6/1993 | Morrison | 364/424.05 |
| 5,229,955 | 7/1993 | Nishiwaki et al. | 364/550 |
| 5,268,841 | 12/1993 | Mouri | 364/424.05 |

FOREIGN PATENT DOCUMENTS

| | | |
|---|---|---|
| 0331204 | 9/1989 | European Pat. Off. . |
| 0379143 | 7/1990 | European Pat. Off. . |
| 0510365 | 10/1992 | European Pat. Off. . |
| 4000557 | 7/1990 | Germany . |
| 61-205560 | 9/1986 | Japan . |
| 1-14068 | 3/1989 | Japan . |

*Primary Examiner*—Kevin J. Teska
*Assistant Examiner*—Dan Fiul
*Attorney, Agent, or Firm*—Cushman Darby & Cushman, L.L.P.

[57] ABSTRACT

An apparatus including an angle determining device for determining a desired value of the vehicle rear-wheel steering angle, on the basis of the actual front-wheel steering angle and vehicle speed, so that the rear-wheel steering angle is changed by an actuator operated according to the determined desired rear-wheel steering angle. The apparatus further includes a control device which controls a change in the rear-wheel steering angle which depends from the vehicle speed, such that the change is smaller in the steady state of the vehicle steering wheel, than in the transient state of the steering wheel. The steady or transient state is determined from a rate of operation of the steering wheel obtained by a suitable device.

19 Claims, 11 Drawing Sheets

VEHICLE REAR WHEEL STEERING ANGLE CONTROLLING APPARATUS HAVING MEANS FOR REDUCING VEHICLE-SPEED-BASED CHANGE IN THE ANGLE, WHEN STEERING WHEEL IS NOT OPERATED

This is a continuation of U.S. patent application 08/009014, filed on Jan. 26, 1993, abandoned Sep. 19, 1995.

BACKGROUND OF THE INVENTION

1. Field of the Invention

The present invention relates generally to an apparatus for controlling the steering angle of the rear wheels of an automotive vehicle, on the basis of parameters which include the steering angle of the front wheels and the running speed of the vehicle. More particularly, the invention is concerned with an arrangement for determining the desired value of the steering angle of the rear wheels.

2. Discussion of the Prior Art

A vehicle rear-wheel steering-angle controlling apparatus of the type indicated above usually includes (a) front-wheel steering angle obtaining means for obtaining or detecting the steering angle of the front wheels of a vehicle, (b) vehicle-speed obtaining means for obtaining or detecting the running speed of the vehicle, (c) angle determining means for determining a desired or target value of the steering angle of the rear wheels, on the basis of operating parameters of the vehicle which include the obtained steering angle of the front wheels and the obtained vehicle running speed, so that the actual steering angle of the rear wheels coincides with the determined target value, (d) an actuator for changing the steering angle of the rear wheels, and (e) actuator driving means for driving the actuator to establish the desired value of the steering angle of the rear wheels.

An example of the rear-wheel steering-angle controlling apparatus of the type described above is disclosed in JP-B-1-14068. The apparatus as disclosed in this publications adapted to change the desired steering angle of the rear wheels as the vehicle running speed is changed as a result of an operation of an accelerator or brake pedal or other operator-controlled member for accelerating or decelerating the vehicle.

However, the known apparatus described above suffers from a problem as described below.

The vehicle runs with the steering angle of the front wheels being controlled by a vehicle operator by means of a steering wheel. The steering wheel is either operated to drive the vehicle along a curve, or held non-operated with the front-wheel steering angle kept substantially constant. Namely, the steering wheel has a transient state in which the steering rate at which the steering wheel is operated is higher than a predetermined threshold (which is close to zero), and a steady state in which the steering rate is equal to or lower than the threshold, for example, the steering rate is substantially zero. In the known apparatus, the steering angle of the rear wheels changes with a change in the vehicle running speed, even in the steady state of the steering wheel. Accordingly, the attitude or orientation of the vehicle on a plane parallel to the road surface, with respect to the running direction of the vehicle may be changed even when the steering wheel is held in substantially the same angular operating position.

Usually, while the vehicle is running in the steady state of the steering wheel, the operator has a better drive feeling when the steering angle of the rear wheels is held constant, unless the rate of change in the vehicle speed is relatively high. It is generally true that the vehicle operator wants to maintain the same attitude or orientation of the vehicle when the operator is holding the steering wheel at the same angular position. Thus, the known apparatus gives the vehicle operator a considerable feeling of discomfort in the steady state of the steering wheel that the manipulation of the steering wheel by the operator does not accurately reflect the actual change in the steering angle of the rear wheels and in the orientation of the vehicle with respect to the desired running direction of the vehicle.

SUMMARY OF THE INVENTION

It is therefore an object of this invention to provide an apparatus for controlling the steering angle of the rear wheels of a motor vehicle, which apparatus is substantially free of the problem experienced in the prior art.

The above object may be accomplished according to the principle of the present invention, which provides an apparatus for controlling a steering angle of rear wheels of a motor vehicle, comprising: (a) front-wheel steering-angle obtaining means for obtaining a steering angle of front wheels of the vehicle; (b) vehicle-speed obtaining means for obtaining a running speed of the vehicle; (c) angle determining means for determining a desired value of the steering angle of the rear wheels, on the basis of operating parameters of the vehicle which include the steering angle of the front wheels and the running speed of the vehicle; (d) an actuator for changing the steering angle of the rear wheels; (e) actuator driving means for driving the actuator to establish the desired value of the steering angle of the rear wheels; (f) steering-rate obtaining means for obtaining a steering rate at which a steering wheel of the vehicle is operated by an operator of the vehicle; and (g) control means for controlling a change in the steering angle of the rear wheels which depends on the running speed, such that the change is smaller in a steady state of the steering wheel in which the steering rate is not higher than a predetermined threshold value, than in a transient state of the steering wheel in which the steering rate is higher than the threshold value.

In the apparatus of the present invention constructed as described above, the steering angle of the rear wheels will not be changed so much in the steady state of the steering wheel as in the transient state, because the control means restricts the change in the steering angle of the rear wheels, when the steering rate is not higher than the threshold value. Thus, the present apparatus will not give the vehicle operator or driver a feeling of discomfort due to discrepancy between the actual manipulation of the steering wheel and the actual rear-wheel steering angle.

BRIEF DESCRIPTION OF THE DRAWINGS

The above and optional objects, features and advantages of the present invention will be better understood by reading the following detailed description of the present invention and the following detailed description of presently preferred embodiments of the invention, when considered in conjunction with the accompanying drawings, in which.

DETAILED DESCRIPTION OF THE INVENTION

Figure 1:
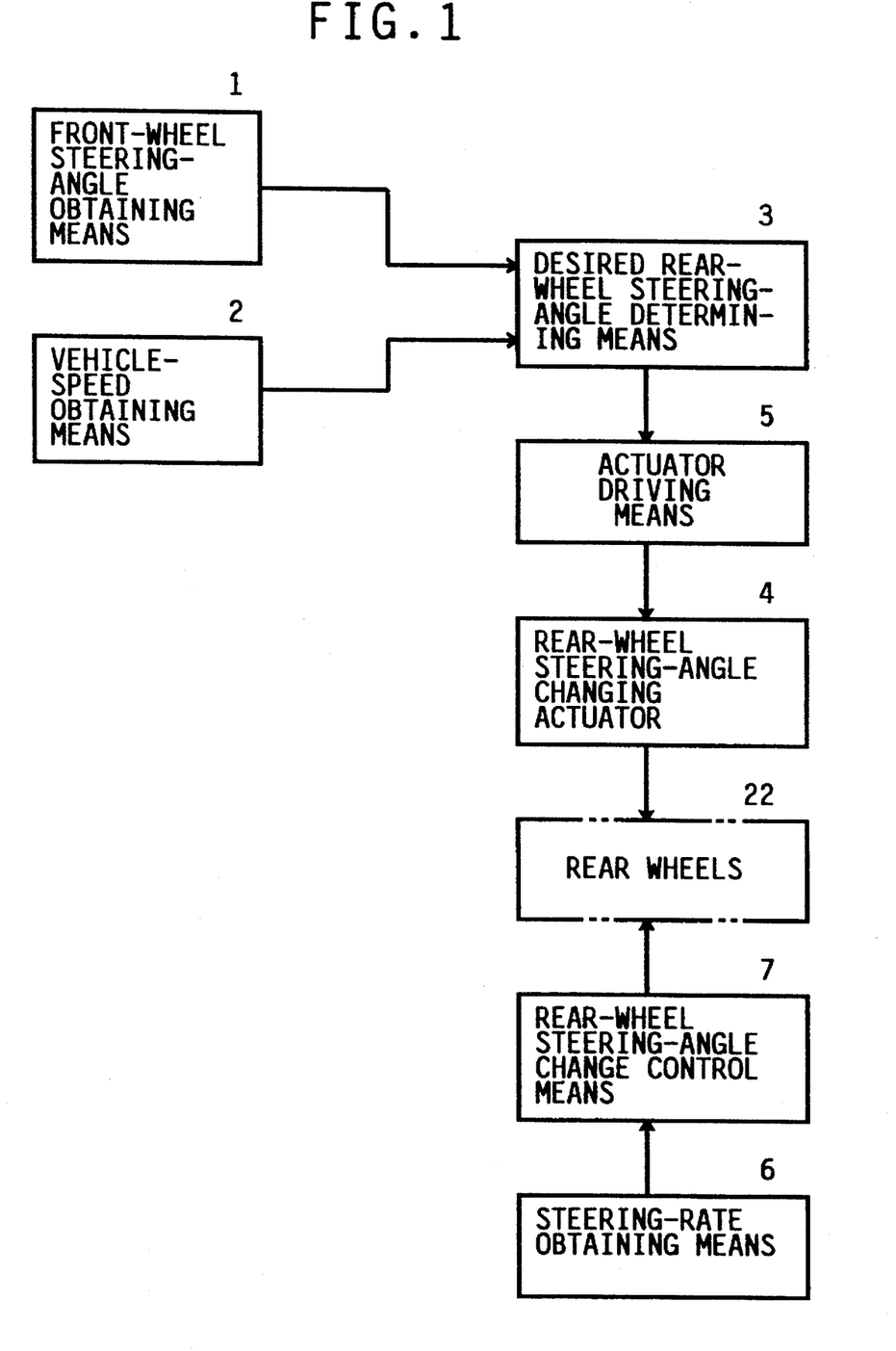
FIG. 1 is a block diagram schematically showing a basic arrangement according to the principle of the present invention.

Referring first to the block diagram of FIG. 1, there will be described a basic arrangement according to the principle of the present invention, wherein the angle determining means 3 is responsive to at least the front-wheel steering angle and vehicle running speed which are obtained by the front-wheel steering-angle obtaining means 1 and vehicle-speed obtaining means 2, respectively, in order to determine the desired or target value of the steering angle of the rear wheels. The actuator driving means 5 operates according to the output of the angle determining means 3, to activate the actuator 4 to change the steering angle of the rear wheels, according to the determined desired steering angle of the rear wheels. When the steering rate obtained by the steering-rate obtaining means 6 is higher than the predetermined threshold value, the actual steering angle of the rear wheels is controlled so as to coincide with the determined target value. When the steering rate is not higher than the threshold value, namely, when the steering wheel is in the steady state, the control means 7 operates to reduce a change in the steering angle of the rear wheel which depends on the vehicle running speed, as compared with a change in the same in the transient state of the steering wheel. Thus, for example, the rate of change in the steering angle of the rear wheels is made smaller in the steady state than in the transient state, provided that the rate of change in the vehicle running speed is constant.

Figure 2:
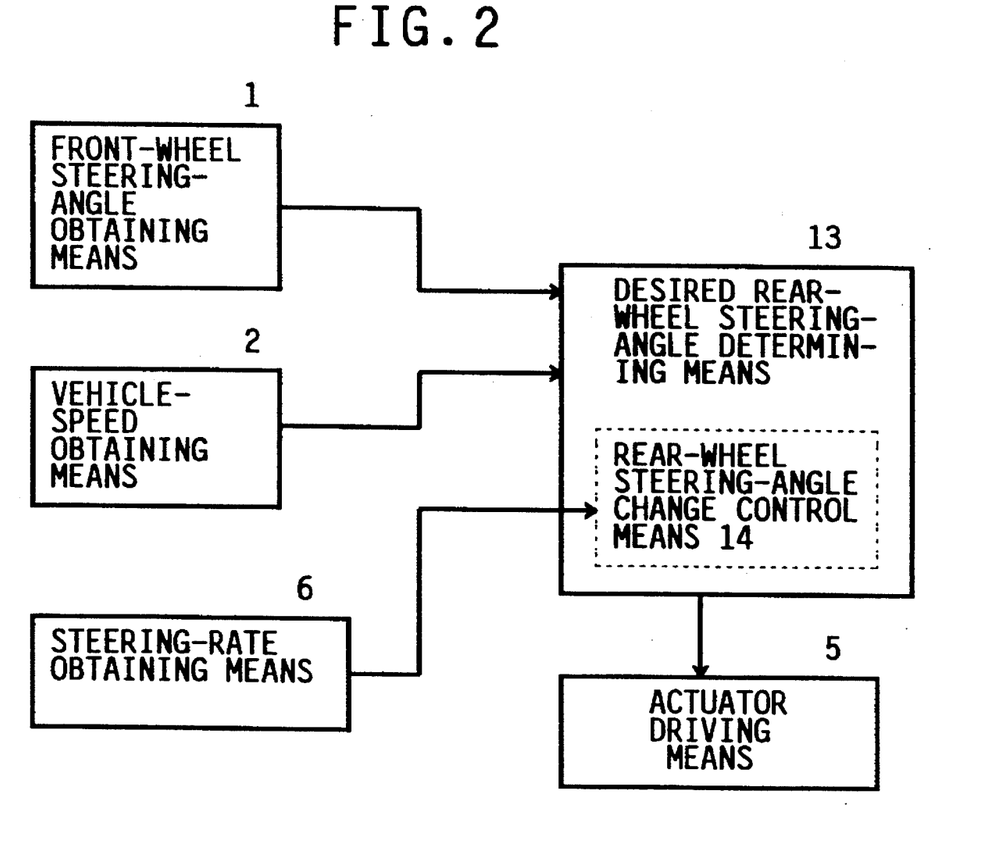
FIGS. 2 and 3 are block diagrams schematically showing two different forms of the structural arrangement of the invention.

According to one arrangement of the present invention as illustrated in FIG. 2, the angle determining means incorporates the control means as shown in FIG. 2. In this case, the control means 14 functions to operate the angle determining means 13 so as to determine the desired value of the steering angle of the rear wheels, on the basis of the steering rate, as well as the steering angle of the front wheels and the vehicle running speed, so that the change in the rear-wheel steering angle which depends on the vehicle speed is made smaller in the steady state of the steering wheel than in the transient state.

In one form of the above arrangement of FIG. 2, the control means 14 may be adapted to inhibit the angle determining means 13 from changing the desired value of the rear-wheel steering angle on the basis of the running speed, when the running speed is not lower than a predetermined threshold value. In another form of the same arrangement, the angle determining means 13 is adapted to determine a rear/front steering ratio which is a ratio of the rear-wheel steering angle to the front-wheel steering angle, on the basis of the operating parameters including the front-wheel steering angle and vehicle running speed, thereby to determine the desired steering angle of the rear wheels by multiplying the front-wheel steering angle by the determined ratio. In this instance, the control means 14 includes ratio restricting means for restricting a change in the rear/front steering ratio with the front-wheel steering angle, when the steering wheel is in the steady state. The ratio restricting means controls the actuator driving means 5 so as to establish the desired rear-wheel steering angle without restriction of the change in the rear/front steering ratio, when the steering wheel is in the transient state. In this form of the invention, the ratio restricting means may restrict the rear/front steering ratio in the steady state of the steering wheel, by inhibiting the rear/front steering ratio from being changed with the steering angle of the front wheels, when the running speed of the vehicle is not lower than a predetermined threshold value.

Figure 3:
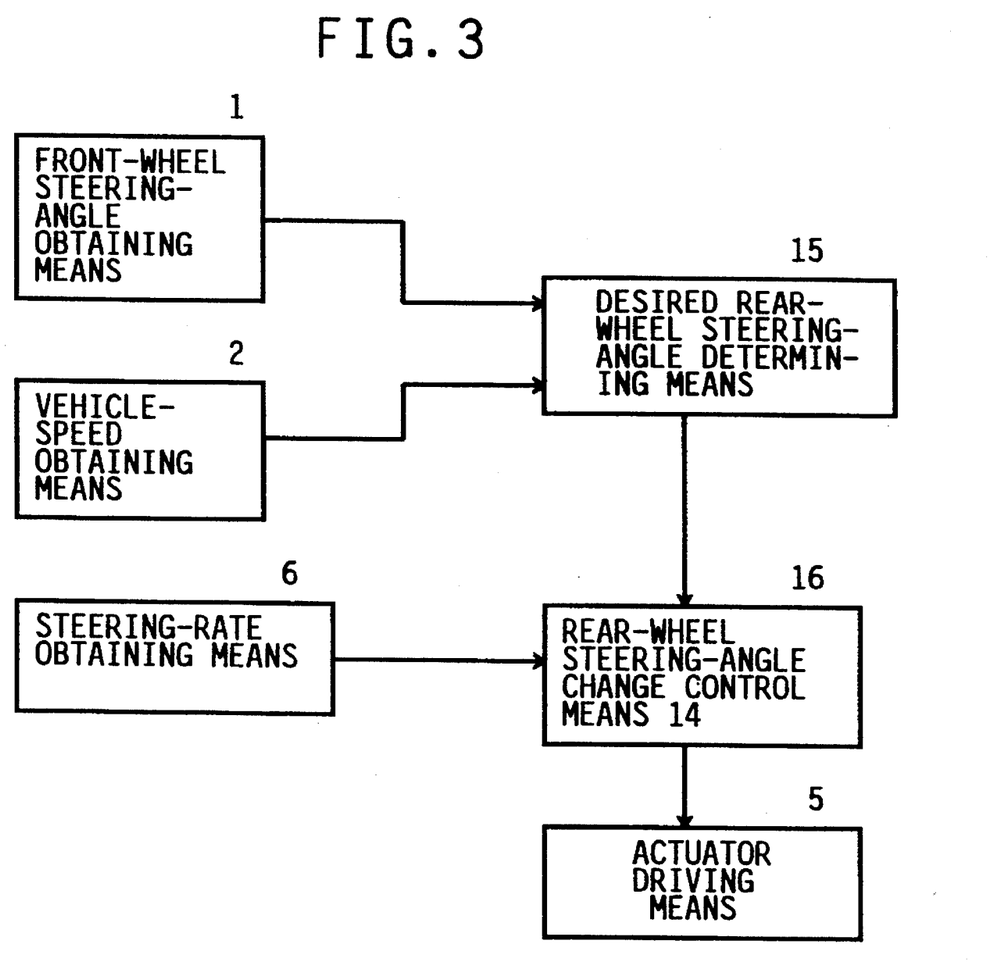

According to an alternative arrangement of the invention as illustrated in FIG. 3, the angle determining means 15 operates, independently of the control means 16, to determine the desired rear-wheel steering angle, without taking the steering rate into consideration, and the control means 16 suitably deals with the determined desired rear-wheel steering angle, depending upon the signal from the steering-rate obtaining means 6. Namely, the control means 16 uses the desired steering angle of the rear wheels as determined by the angle determining means 15 when the steering wheel is in the transient state, but changes the determined desired rear-wheel steering angle when the steering wheel is in the steady state.

Usually, the angle determining means 15 repeats a cycle of determining the desired rear-wheel steering angle, at a predetermined cycle time. In one form of the above arrangement, the control means 16 renders effective the desired rear-wheel steering angle as determined by the angle determining means 15 in the present cycle of determination, when the steering wheel is in the transient state. In the steady state of the steering wheel, on the other hand, the control means 16 renders effective the desired rear-wheel steering angle as determined in the preceding cycle of determination, while rendering ineffective the desired value as determined in the present cycle.

In another form of the above arrangement of FIG. 3 wherein the control means 16 deals with the desired rear-wheel steering angle as determined by the angle determining means 15, the control means 16 enables the actuator driving means 5 to establish the desired rear-wheel steering angle as determined by the angle determining means 15 when the steering wheel is in a transient state, but inhibits the actuator from operating to establish the desired rear-wheel steering angle as determined by the angle determining means when the steering wheel is in a steady state.

In a further form of the same arrangement, the control means uses the desired rear-wheel steering angle as determined by the angle determining means when the steering wheel is in steady state and when a time derivative of the vehicle running speed is higher than a predetermined threshold value. When the time derivative of the vehicle speed is not higher than the threshold value in a steady state of the steering wheel, the control means operates to reduce the change of the desired rear-wheel steering angle as determined by the angle determining means.

DETAILED DESCRIPTION OF THE PREFERRED EMBODIMENTS

Referring next to FIGS. 4–13, there will be described in detail a presently preferred embodiment of the apparatus of this invention, for illustrative purpose only.

Figure 4:
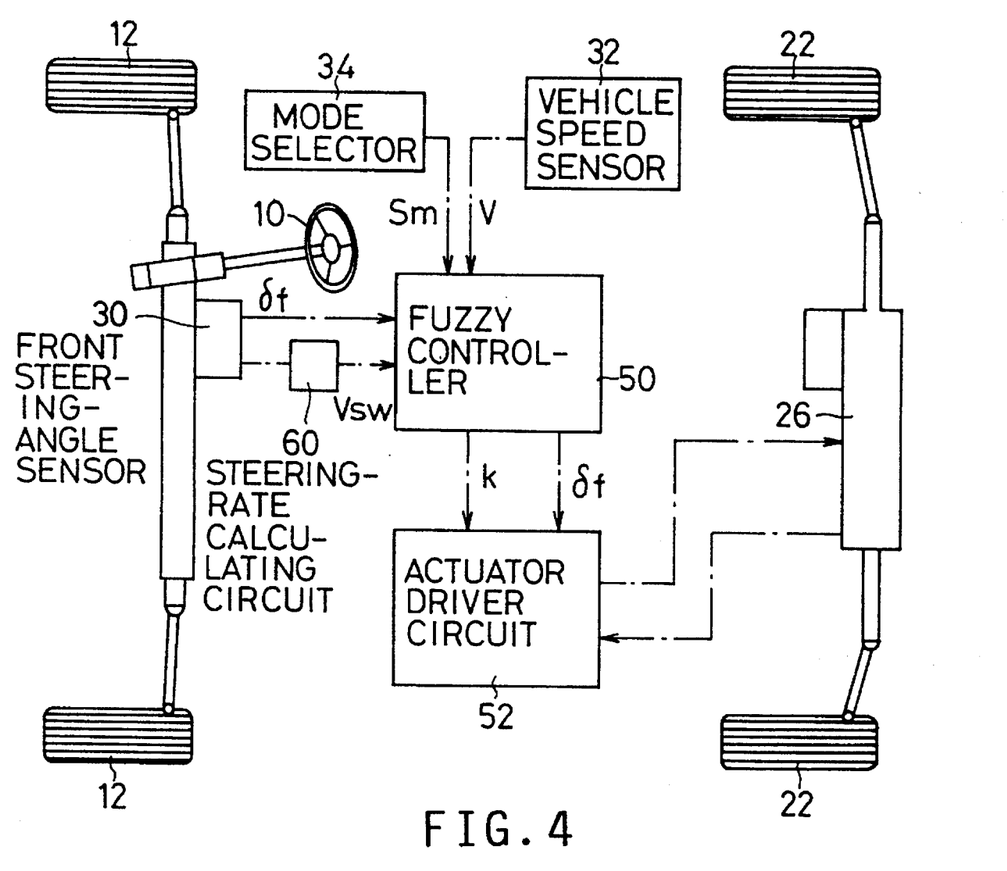
FIG. 4 is a view illustrating a motor vehicle equipped with an apparatus constructed according to one preferred embodiment of the invention.

The present apparatus is provided on a motor vehicle in which a steering angle δf of front wheels 12 is changed as a steering wheel 10 is operated or rotated by the vehicle operator. The apparatus is adapted to control a steering angle δr of rear wheels 22 of the vehicle. To this end, the apparatus includes: a rear-wheel steering-angle changing actuator 26 to change the steering angle δr of the rear wheels 22; a front-wheel steering-angle sensor 30 to detect the steering angle δf of the front wheels 12; a vehicle-speed sensor 32 for detecting a running speed V of the vehicle; and a mode selector 34 in the form of a dial which is rotated by the vehicle driver, to set a desired "steering response" of the vehicle.

The mode selector dial 34 is rotatable between a "NORMAL" position and a "SPORTY" position, and generates an output signal Sm. The steering response is at a maximum in the SPORTY position, while the vehicle running stability is at a maximum in the NORMAL position. The term "steering response" used herein is interpreted to mean the sensitivity of the vehicle to the steering angle δf of the front wheels 12 in determining the running direction of the vehicle. In this respect, it is noted that the vehicle running direction in which the vehicle runs or is expected to run should be distinguished from the instantaneous attitude or orientation of the vehicle in a plane parallel to the road surface.

The apparatus is provided with a fuzzy controller 50 and an actuator driver circuit 52. The fuzzy controller 50 is adapted to receive the outputs of the front-wheel steering-angle sensor 30, vehicle-speed sensor 32 and mode selector 34, and apply output signals to the actuator driver circuit 52.

The actuator 26 is controlled according to a drive signal received from the driver circuit 52. The output of the sensor 30 is also applied to a steering-rate calculating circuit 60, which in turn is connected to the fuzzy controller 50. The calculating circuit 60 is adapted to calculate a steering rate Vsw of the steering wheel 10, in the form of a time derivative Vsw of the front-wheel steering angle δf received from the sensor 30. The output of the calculating circuit 60 which represents the time derivative or steering rate Vsw is applied to the fuzzy controller 50.

The present apparatus controls the actual steering angle δr of the rear wheels 22, so that the actual angle δr coincides with a desired or target value δr* which is calculated according to the following equation, so that the attitude or orientation of the vehicle in the plane parallel to the road surface coincides with the operator's desired running direction of the vehicle as represented by the steering angle δf of the front wheels 12:

$$\delta r^* = k \cdot \delta f$$

where, k=rear/front steering ratio

δf=actual front-wheel steering angle detected by the sensor 30

The rear/front steering ratio k is a ratio of the steering angle δr of the rear wheels 22 to the steering angle δf of the front wheels 12.

The fuzzy controller 50 is constituted principally by a computer which incorporates a central processing unit (CPU), a read-only memory (ROM), a random-access memory (RAM) and a data bus. The fuzzy controller 50 operates to determine the rear/front steering ratio k as a consequent variable, by a fuzzy inference on the basis of vehicle operating parameters as antecedent variables which consist of the steering rate Vsw, front-wheel steering angle δf, vehicle running speed V, and the output Sm of the mode selector 34 representative of the preset steering response of the vehicle. To this end, the ROM of the fuzzy controller 50 stores control data and programs which include: (a) fuzzy inference programs; (b) a plurality of membership functions associated with each of the operating parameters or variables δf (front-wheel steering angle), V (vehicle speed), Vsw (steering rate), output Sm of the mode selector 34, and rear/front steering ratio k, as illustrated in the graphs of FIGS. 5, 6, 7, 8 and 9 respectively; (c) a rule for converting a fuzzy inference value of the rear/front steering ratio k as obtained by the fuzzy inference, into the actually used rear/front steering ratio k, as illustrated in the graph of FIG. 10, and (d) a plurality of fuzzy control rules as embodied in a data table illustrated in TABLE 1.

One example of the fuzzy control rules as embodied in the data table of TABLE 1 is expressed as: IF Vsw=PS, δf=NL, Sm ("steering response")= ZR, and V=NL, THEN k=PS.

TABLE 1

| | | \|Vsw\| | | | | | | | | | | | | | |
| --- | --- | --- | --- | --- | --- | --- | --- | --- | --- | --- | --- | --- | --- | --- | --- |
| | | ZR | | | | | | | PS | | | | | | |
| | | δf | | | | | | | | | | | | | |
| Sm | V | NL | NM | NS | ZR | PS | PM | PL | NL | NM | NS | ZR | PS | PM | PL |
| ZR | NL | PS | ZR | NS | NM | NL | NL | NL | PS | ZR | NS | NM | NL | NL | NL |
| | NM | PM | PS | ZR | NS | NM | NL | NL | PM | PS | ZR | NS | NM | NL | NL |
| | NS | PL | PM | PS | ZR | ZR | ZR | ZR | PM | PS | ZR | NS | NS | NS | NS |

TABLE 1-continued

| | | |Vsw| | | | | | | | | | | | |
|---|---|---|---|---|---|---|---|---|---|---|---|---|---|---|
| | | | ZR | | | | | | PS | | | | | |
| | | | δf | | | | | | | | | | | |
| Sm | V | NL | NM | NS | ZR | PS | PM | PL | NL | NM | NS | ZR | PS | PM | PL |
| | ZR | PL | PM | PS | ZR | ZR | ZR | ZR | PM | PS | ZR | ZR | ZR | ZR | ZR |
| | PS | PL | PM | PS | ZR | ZR | ZR | ZR | PL | PM | PS | ZR | ZR | ZR | ZR |
| | PM | PL | PM | PS | ZR | ZR | ZR | ZR | PL | PL | PM | PS | ZR | ZR | ZR |
| | PL | PL | PM | PS | ZR | ZR | ZR | ZR | PL | PL | PL | PM | PS | ZR | ZR |
| PS | NL | ZR | NS | NM | NL | NL | NL | NL | ZR | NS | NM | NL | NL | NL | NL |
| | NM | PS | ZR | NS | NM | NL | NL | NL | PS | ZR | NS | NM | NL | NL | NL |
| | NS | PM | PS | ZR | ZR | ZR | ZR | ZR | PS | ZR | NS | NS | NS | NS | NS |
| | ZR | PM | PS | ZR | ZR | ZR | ZR | ZR | PS | ZR | ZR | ZR | ZR | ZR | ZR |
| | PS | PM | PS | ZR | ZR | ZR | ZR | ZR | PM | PS | ZR | ZR | ZR | ZR | ZR |
| | PM | PM | PS | ZR | ZR | ZR | ZR | ZR | PL | PM | PS | ZR | ZR | ZR | ZR |
| | PL | PM | PS | ZR | ZR | ZR | ZR | ZR | PL | PL | PM | PS | ZR | ZR | ZR |
| PL | NL | NS | NM | NL | NL | NL | NL | NL | NS | NM | NL | NL | NL | NL | NL |
| | NM | ZR | NS | NM | NL | NL | NL | NL | ZR | NS | NM | NL | NL | NL | NL |
| | NS | PS | ZR | ZR | ZR | ZR | ZR | ZR | ZR | NS | NS | NS | NS | NS | NS |
| | ZR | PS | ZR | ZR | ZR | ZR | ZR | ZR | ZR | ZR | ZR | ZR | ZR | ZR | ZR |
| | PS | PS | ZR | ZR | ZR | ZR | ZR | ZR | PS | ZR | ZR | ZR | ZR | ZR | ZR |
| | PM | PS | ZR | ZR | ZR | ZR | ZR | ZR | PM | PS | ZR | ZR | ZR | ZR | ZR |
| | PL | PS | ZR | ZR | ZR | ZR | ZR | ZR | PL | PM | PS | ZR | ZR | ZR | ZR |

Since the fuzzy inference programs are well known in the art (as disclosed in "FUZZY CONTROL", 1st edition, 5th printing, Jul. 20, 1989, Nikkan Kogyo Newspaper, Japan) and since the understanding of these programs is not essential to the understanding of the principle of the present invention, the fuzzy inference programs will be only briefly explained. Initially, degrees of non-fuzziness or degrees of satisfaction ωi of the fuzzy control rules are calculated on the basis of the antecedent variables δf, V, Vsw and Sm. Then, a fuzzy inference value is calculated for each of the fuzzy control rules, on the basis of the calculated degrees of non-fuzziness or satisfaction ωi and the membership function associated with the rear/front steering ratio k. The calculated fuzzy inference values are totally evaluated to obtain an overall inference value, namely, a fuzzy inference value of the rear/front steering ratio k. Finally, the obtained fuzzy inference value is converted into the rear/front steering ratio k, according to a rule as represented in the graph of FIG. 10.

In the present apparatus, a suitable number of fuzzy labels are used for each of the antecedent variables. An example of a fuzzy inference using the fuzzy labels is disclosed in U.S. Pat. No. 4,930,084.

Figure 5:
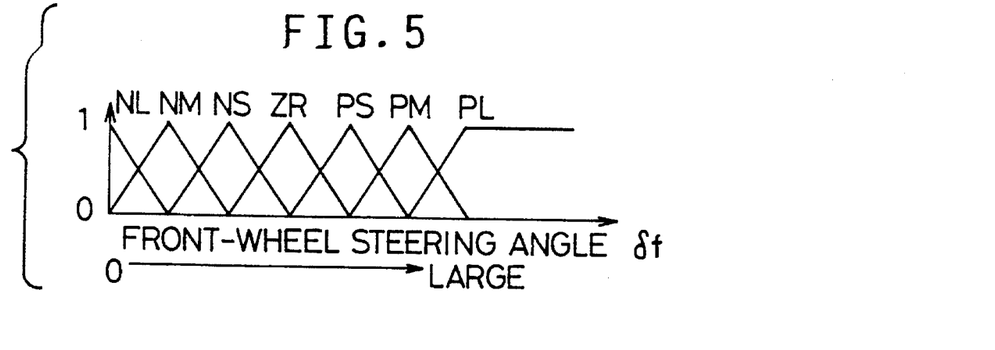
FIG. 5 is a graph indicating membership functions used by a fuzzy controller of the apparatus of FIG. 4, which are associated with a front-wheel steering angle $\delta f$ of the vehicle.

For the variable δf (front-wheel steering angle), seven fuzzy labels NL (negative large), NM (negative medium), NS (negative small), ZR (zero), PS (positive small), PM (positive medium) and PL (positive large) are used. As shown in FIG. 5, these fuzzy labels NL, NM, NS, ZR, PS, PM and PL are assigned to respective ranges of the front-wheel steering angle δf, which increase in the order of description. These ranges overlap each other as shown in the figure.

Figure 6:
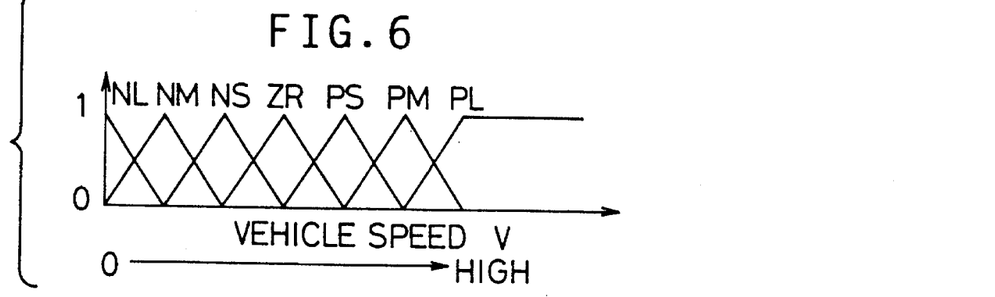
FIG. 6 is a graph indicating membership functions used by the fuzzy controller, which are associated with a running speed V of the vehicle.

For the variable V (vehicle running speed), the seven fuzzy labels indicated above are assigned to respective ranges thereof, as shown in FIG. 6, as in the case of the fuzzy labels for the variable δf.

Figure 7:
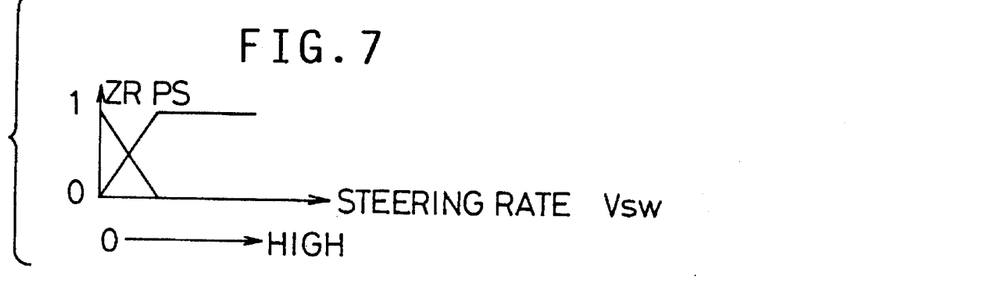
FIG. 7 is a graph indicating membership functions used in the fuzzy controller, which are associated with an operating speed of a steering wheel of the vehicle, that is, a steering rate Vsw.

For the variable Vsw (steering rate), two fuzzy labels ZR and PS are assigned to respective two ranges of the absolute value |Vsw|, which overlap each other, as shown in FIG. 7.

Figure 8:
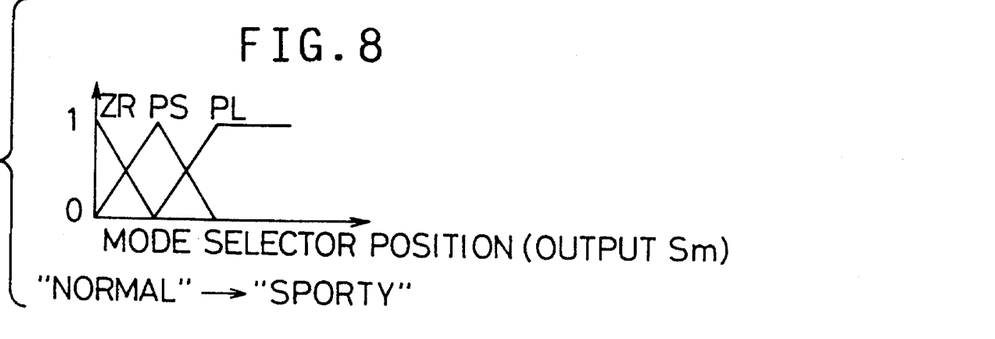
FIG. 8 is a graph indicating membership functions used in the fuzzy controller, which are associated with a steering response of the vehicle.

For the last antecedent variable Sm which is the output of the mode selector 34, three fuzzy labels ZR, PS and PL are assigned to respective ranges of the output of the mode selector 34, which overlap each other, as shown in FIG. 8. The output Sm changes with a change in the operating position of the selector 34 between the "NORMAL" and "SPORTY" positions of the switch.

Figure 9:
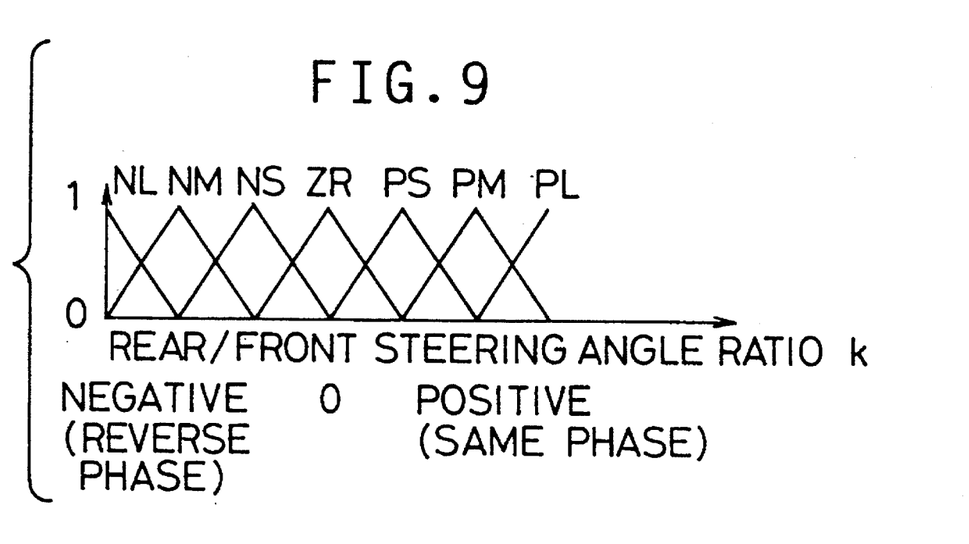
FIG. 9 is a graph indicating membership functions used in the fuzzy controller, which are associated with a rear/front steering ratio k.
Figure 10:
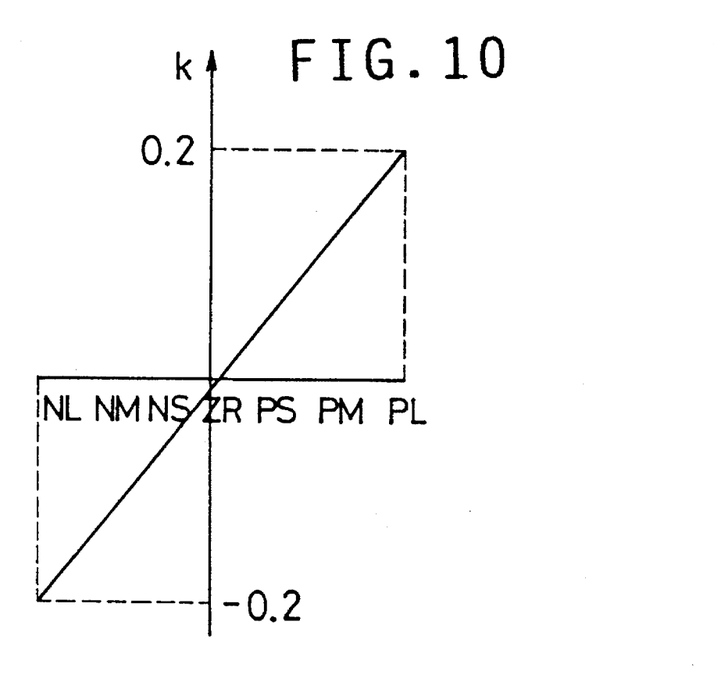
FIG. 10 is a graph showing a rule for converting a fuzzy inference value obtained by fuzzy inference by the fuzzy controller, into the rear/front steering ratio k.

The seven fuzzy labels as used for the antecedent variables δf and V are used for the consequent variable, that is, rear/front steering ratio k, as shown in FIG. 9. The ratio k may be negative, zero or positive. The fuzzy labels NL, NM, NS, ZR, PS, PM and PL are assigned to respective overlapping ranges of the ratio k, which increase in the order of description. When the ratio k is negative, the planes of the rear wheels perpendicular to axes thereof are inclined on one of opposite sides of the neutral position of the wheels, while the planes of the front wheels are inclined on the other side of the neutral position. In this condition, the rear wheels are in the reverse phase with respect to the front wheels.

Figure 11:
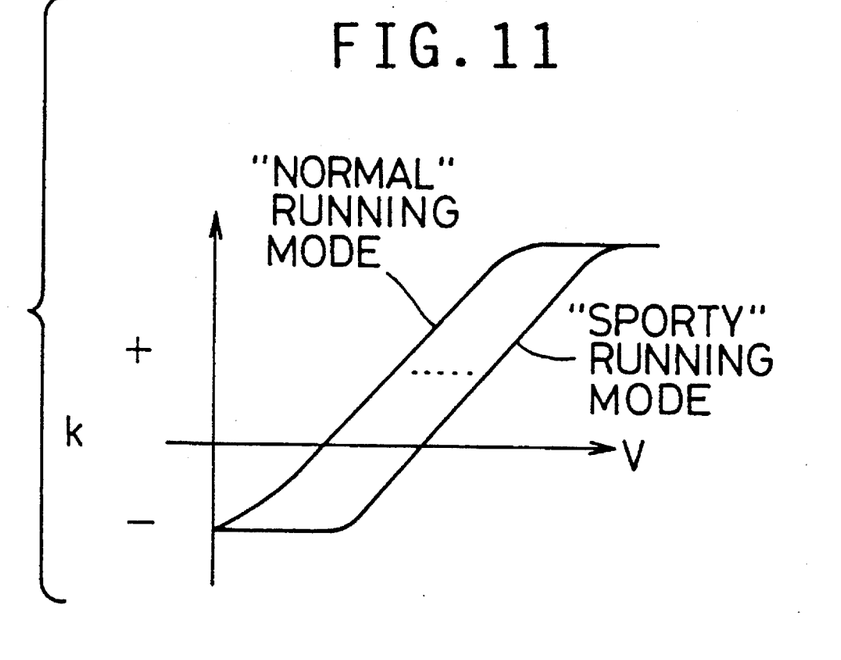
FIGS. 11 and 12 are graphs explaining fuzzy control rules used by the fuzzy controller to determine the rear/front steering ratio.

The fuzzy rules used in the present apparatus are formulated based on the following design concept:

Firstly, the control rules are adapted so that the rear/front steering ratio k changes with the vehicle running speed V, as shown in FIG. 11. Further, the ratio k is negative when the vehicle running speed V is relatively low and positive when the speed V is relatively high, as also shown in FIG. 11. This concept is incorporated in the data table shown in TABLE 1. For example, if the fuzzy label PS is selected for the steering rate Vsw, and the fuzzy label ZR is selected for both the front-wheel steering angle δf and the output Sm of the mode selector 34, the ratio k increases with the fuzzy label changing in the order of NM, NS, ZR, PS and PM, as the speed V increases from zero (as represented by the fuzzy label NL=1 as indicated in FIG. 6).

The fuzzy control rules are further formulated such that the rear/front steering ratio k decreases with an increase in the output Sm (with an increase in the preset "steering response"). That is, the ratio k decreases as the dial of the mode selector 34 is turned from the "NORMAL" position to the "SPORTY" position, as is also apparent from the graph of FIG. 11. This concept is also incorporated in the data table of TABLE 1. For instance, if the fuzzy labels PS, ZR and PL are selected for the variables Vsw, δf and V, respectively, the rear/front steering ratio k decreases with the fuzzy label changing in the order of PM, PS and ZR, as the output Sm or "steering response" increases.

The fuzzy control rules are further formulated so as to (1) to restrict the change in the rear/front steering ratio k in the steady state of the steering wheel 10 in which the steering rate Vsw is substantially zero, and (2) not to restrict the change in the ratio k in the transient state of the steering wheel 10 in which the steering rate Vsw is not substantially zero. This concept is incorporated in the data table of TABLE 1, such that if the fuzzy label ZR is selected for the variable Vsw when the vehicle running speed V is relatively high (equal to the level as represented by the fuzzy label NS, or higher), the ratio k for each combination of the front-wheel steering angle δf and the output Sm of the mode selector 34 remains constant even if the vehicle speed V changes, and such that if the fuzzy label PS is selected for the variable Vsw in the same condition, the ratio k changes relatively frequently with the vehicle speed V, particularly when the front-wheel steering angle δf is relatively small.

For example, if the fuzzy labels NL and ZR are selected for the variable δf and Sm, respectively when the vehicle speed V is relatively high with the fuzzy label NS, ZR, PS, PM or PL being selected, the same fuzzy label PL is assigned irrespective of the vehicle speed V when the steering wheel 10 is in the steady state with the fuzzy label ZR being selected, while the two different fuzzy labels PL and PM are assigned when the steering wheel 10 is in the transient state with the fuzzy label PS being selected.

Therefore, the fuzzy control rules are formulated such that the rear/front steering ratio k and the desired value δr* of the rear-wheel steering angle δr are less sensitive to a change in the vehicle speed V, in the steady state of the steering wheel 10, than in the transient state, while the vehicle speed is relatively high.

Figure 12:
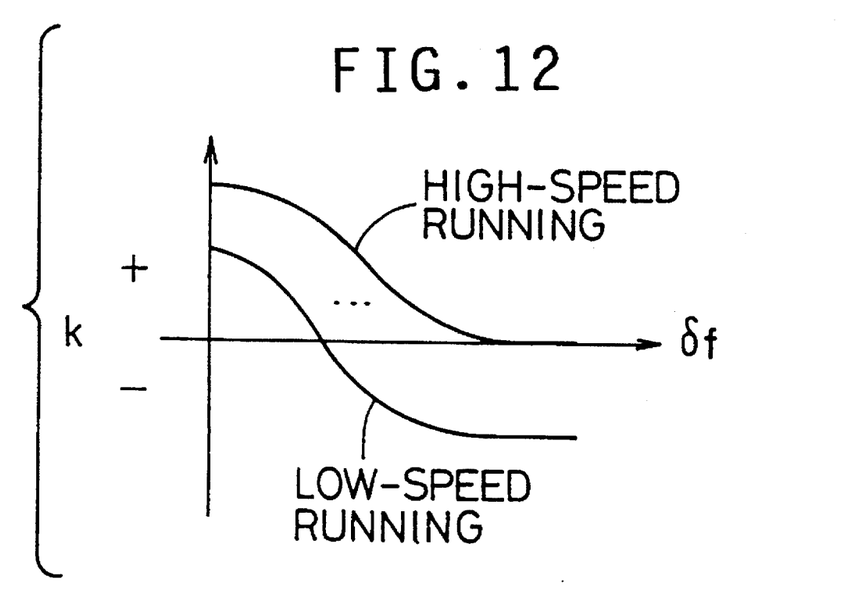

The fuzzy control rules are also formulated such that the rear/front steering ratio k decreases with an increase in the front-wheel steering angle δf, as indicated in the graph of FIG. 12, so as to (i) increase the response or sensitivity of the vehicle yaw rate to an operation of the steering wheel 10, upon steady cornering (running along a curve) of the vehicle, for thereby facilitating the cornering or turning of the vehicle, where the front and rear wheels 12, 22 are in the same phase (inclined on the same side of their neutral position), and (ii) increase the response or sensitivity of the transverse or lateral acceleration of the vehicle to the operation of the steering wheel 10, upon straight running of the vehicle, for thereby facilitating a lane change of the vehicle, that is, a lateral movement of the vehicle from one lane to another on the road surface. Further, the fuzzy control rules are formulated to permit the ratio k to become negative when the front-wheel steering angle 6f exceeds a given limit, while the vehicle speed V is relatively low, but inhibit the ratio k to be negative while the vehicle speed V is relatively high, as also indicated in the graph of FIG. 12.

The above concept to attain the above purposes (i) and (ii) is incorporated in the data table of TABLE 1. For example, if the fuzzy label PS is selected for the variable Vsw while the fuzzy label ZR is selected for the variables V and Sm, the ratio k decreases in the order of PM, PS and ZR with an increase in the front-wheel steering angle δf.

Figure 13:
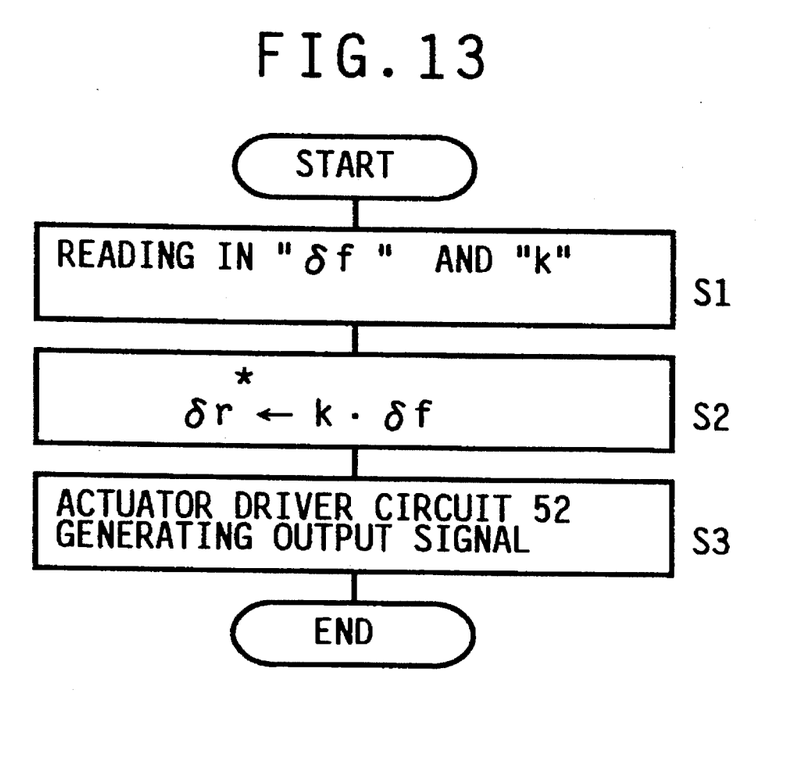
FIG. 13 is a flow chart illustrating an operation of the apparatus of FIG. 4 to control the rear-wheel steering angle of the vehicle.

The actuator driver circuit 52 is also constituted principally by a computer whose read-only memory (ROM) stores control programs such as a control routine illustrated in the flow chart of FIG. 13.

The control routine of FIG. 13 is executed at predetermined cycle times. Initially, step S1 is implemented to read in the front-wheel steering angle 6f and the rear/front steering ratio k received from the fuzzy controller 50. Step S2 is then implemented to calculate the desired value δr* of the rear-wheel steering angle δr, by multiplying the front-wheel steering angle δf by the ratio k. Step S2 is followed by step S3 to generate an output signal to be applied to the actuator 26 so that the actual rear-wheel steering angle δr is changed to the calculated desired rear-wheel steering angle δr*.

In the present embodiment, the desired rear-wheel steering angle δr* is determined by obtaining a product of the rear/front steering ratio k and the front-wheel steering angle δf. In a known arrangement of this type of apparatus, the ratio k is increased with an increase in the vehicle running speed V, irrespective of whether the steering wheel 10 is in a steady state or in a transient state, namely, whether or not the steering speed Vsw is substantially or almost zero. Accordingly, the actual rear-wheel steering angle δr will change with a result of changing the attitude or orientation of the vehicle, when the vehicle speed V changes, even while the steering wheel 10 is kept in substantially the same position. Thus, the known arrangement tends to give the vehicle operator a feeling of discomfort that the steering or orientation of the vehicle does not meet the operator's manipulation of the steering wheel 10, more specifically, the rate of operation of the steering wheel 10.

According to the present apparatus constructed according to the principle of this invention, the change in the rear/front steering ratio k (and consequently the change in the actual rear-wheel steering angle δr) depending upon the vehicle speed V is made smaller in the steady state than in the transient state of the steering wheel 10. Hence, the present apparatus gives the vehicle operator substantially no feeling of discomfort due to discrepancy between the operating condition of the steering wheel 10 and the actual change in the attitude or orientation of the vehicle.

In the known arrangement indicated above, the vehicle driver must manipulate the steering wheel 10 to correct an unexpected excessive degree of change in the vehicle attitude (excessive turning of the vehicle) which may occur due to a change in the vehicle speed V. This may happen, for example, if the vehicle is decelerated with the front and rear wheels 12, 22 placed in the same phase with their planes (perpendicular to the axes) inclined on the same side of the neutral position (straight forward position). More specifically described, the deceleration of the vehicle in the above condition will result in reducing the rear/front steering ratio k, which in turn causes a decrease in the actual rear-wheel steering angle δr (which causes the planes of the rear wheels 22 to be moved toward their neutral position). As a result, the cornering forces on the rear wheels 22 are reduced, and the rear wheels 22 tend to move in the axially outward direction with respect to the desired running direction of the vehicle. Accordingly, the vehicle operator must manipulate the steering wheel 10 to correct the excessive turning tendency by changing the steering angle 6f of the front wheels 12.

In the present embodiment of the invention, the change in the ratio k with a change in the vehicle speed V is restricted in the steady state of the steering wheel 10. Therefore, as long as the steering wheel 10 is held in substantially the same position, the rear-wheel steering angle δr will not change to change the attitude or orientation of the vehicle in the plane parallel to the road surface. Accordingly, the present apparatus frees the vehicle operator from an undesirable manipulation of the steering wheel 10 to correct the vehicle attitude, and assures easy steering of the vehicle.

It will be understood from the foregoing description that the sensor 30 constitutes one form of front-wheel steering-angle obtaining means for obtaining the steering angle δf of the front wheels 12, while the sensor 32 constitutes one form of vehicle-speed obtaining means for obtaining the running speed V of the vehicle. It will also be understood that the calculating circuit 60 constitutes one form of steering-rate obtaining means for obtaining the steering rate Vsw of the steering wheel 10, and that the fuzzy controller 50, mode selector 34 and the portions of the driver circuit 52 assigned to implement steps S1 and S2 of the flow chart of FIG. 13 cooperate to constitute one form of angle-determining means for determining the desired value δr* of the rear-wheel steering angle δr. It will further be understood that the portions of the driver circuit 52 assigned to implement step S3 of the flow chart of FIG. 13 constitute one form of actuator driving means for driving the actuator 26, and that the fuzzy controller 50 whose ROM stores the fuzzy control rules of TABLE 1 constitutes one form of control means for controlling the change in the rear/front steering ratio k such that the change in the ratio k which depends upon the vehicle speed V is restricted in the steady state of the steering wheel 10.

In the present embodiment the desired rear-wheel steering angle δr* is determined by fuzzy inference, on the basis of the antecedent parameters or variable δf, V, Vsw and Sm, and according to the stored memberships functions for the variables, and the fuzzy control rules embodied as the data table as indicated in TABLE 1. Since these membership functions and fuzzy control 10 rules can be relatively easily formulated to correspond to human languages, it is comparatively simple to accurately reflect the designer's design concepts or policies on the membership functions and fuzzy control rules, in determining the desired rear-wheel steering angle δr* by the fuzzy inference, even if the design concepts are not sufficiently specific.

Although fuzzy inference is used to determine the rear/front steering ratio k or the desired rear-wheel steering angle δr*, the ratio k or desired steering angle δr* may be otherwise determined, without departing from the principle or spirit of the invention.

In the illustrated embodiment of FIGS. 4–13, the angle determining means incorporates the control means as shown in FIG. 2, such that the desired rear-wheel steering angle δr* is determined by the angle determining means under the control of the control means so that the change in the determined desired rear-wheel steering angle δr* is smaller in the steady state of the steering wheel 10, than in the transient state, as described above in detail. However, the angle determining means may be adapted to operate independently of the steering-rate obtaining means and the control means, as shown in FIG. 3, so as to determine the desired rear-wheel steering angle δr*, irrespective of whether the steering wheel 10 is in the steady state or in the transient state, that is, so as to determine the desired angle δr* to be suitable in the transient state of the steering wheel 10. In this case, the control means uses the desired angle δr* as determined by the angle determining means when the steering wheel 10 is in the transient state, but changes or modifies the determined desired angle δr* when the wheel 10 is in the transient state.

Figure 14:
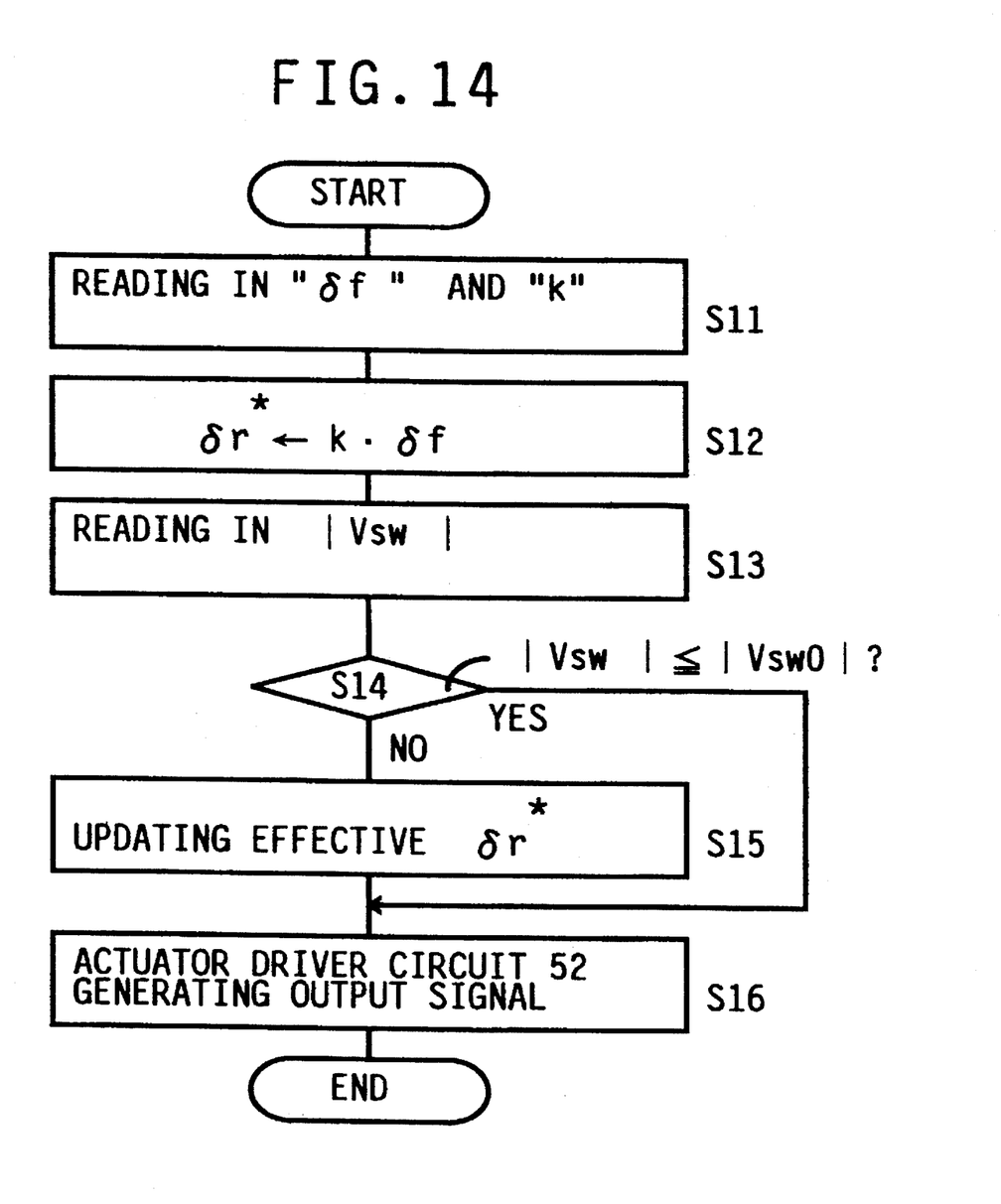
FIG. 14 is a flow chart illustrating an operation of the apparatus constructed according to another embodiment of this invention.

One form of the modification indicated above is illustrated in the flow chart of FIG. 14, which shows a modified control routine for controlling the actuator 26. Like the control routine of FIG. 13, the control routine of FIG. 14 is executed at a predetermined cycle time, to repeat a cycle of determining the desired value δr* of the rear-wheel steering angle δr. Initially, step S11 is implemented to read in the variables δf and k. The control flow then goes to step S12 to calculate the desired rear-wheel steering angle δr* by multiplying the variable δf (front-wheel steering ratio) by the variable k (rear/front steering ratio). Then, step S13 is implemented to read in the absolute value of the steering rate |Vsw| of the steering wheel 10. Step S13 is followed by step S14 to determine whether the steering wheel 10 is in the steady state or not, namely, whether or not the absolute value of the steering rate |Vsw| is equal to or smaller than a predetermined threshold value |Vswo| (which is close to zero). If the absolute value of the steering rate |Vsw| is larger than the threshold value |Vswo|, that is, if the steering wheel 10 is in the transient state, a negative decision (NO) is obtained in step S14, whereby the control flow goes to step S15 in which the desired rear-wheel steering angle δr* determined in step S12 in the last control cycle is replaced by the desired angle δr* determined in step S12 in the present control cycle. In other words, step S15 is implemented to update the effective desired rear-wheel steering angle δr*. In this case, namely, in the transient state of the steering wheel 10, therefore, the driver circuit 52 activates, in step S16, the actuator 26, according to the desired rear-wheel steering angle δr* which has been updated in step S15. If an affirmative decision (YES) is obtained in step S14, this means that the steering wheel 10 is in the steady state. In this case, the control flow skips step S15, and directly goes to step S16, whereby the desired rear-wheel steering angle δr* is not updated in step S15, so that the driver circuit 52 activates the actuator 26, according to the desired rear-wheel steering angle δr* which was determined in the last control cycle. Consequently, the actual rear-wheel steering angle δr is not changed by the actuator 26.

In another form of the modification, the control means is adapted to enable or disable the actuator driving means to establish the desired rear-wheel steering angle δr* as determined by the angle determining means, depending upon whether the steering wheel 10 is in the steady or transient state. In the transient state, the control means enables the actuator driving means to operate according to the determined desired angle δr*. In the steady state, the control means inhibits the actuator driving means from operating according to the determined desired angle δr*.

Figure 15:
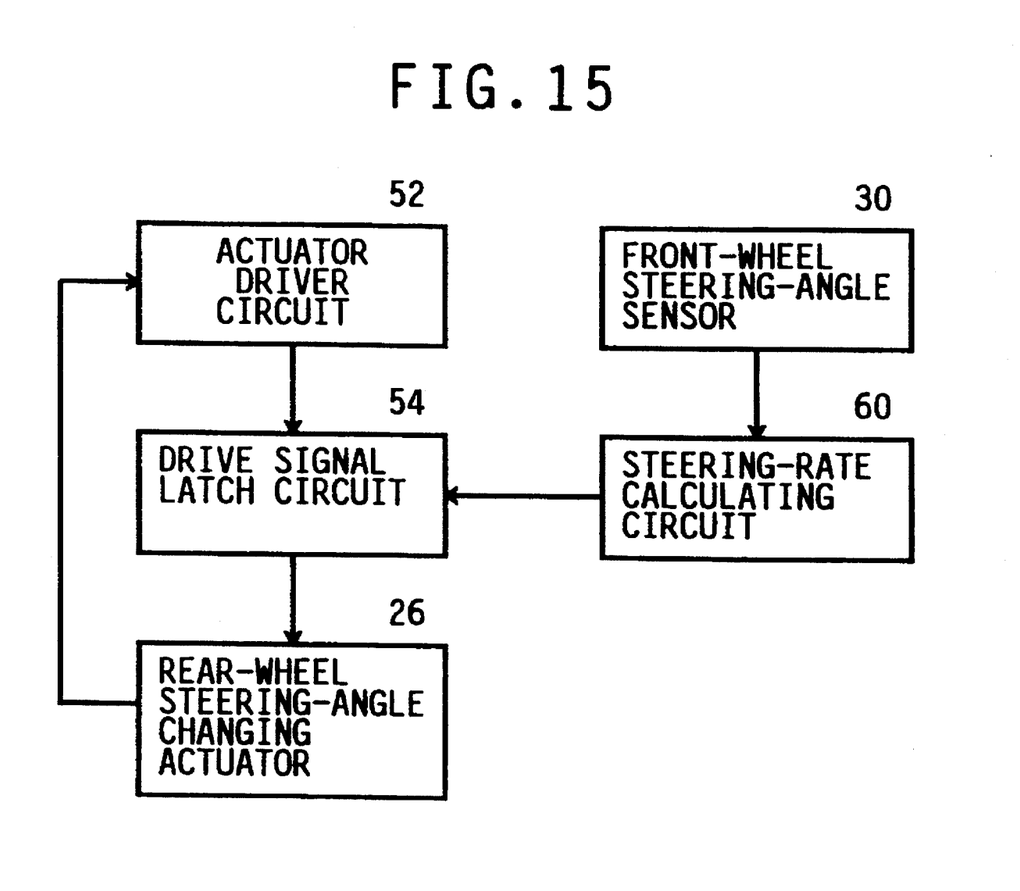
FIG. 15 is a block diagram schematically showing a further embodiment of the invention.

Referring to FIG. 15, there is illustrated one example of the above form of the modification, in which a drive signal latch circuit 54 is interconnected between the actuator driver circuit 52 and the actuator 26. The drive signal latch circuit 54 receives the output of the steering-rate calculating circuit 60 connected to the front-wheel steering angle sensor 30. If the received output of the calculating circuit 60 indicates that the steering wheel 10 is in the transient state, the latch circuit 54 applies to the actuator 26 the drive signal received from the actuator driver circuit 52, which has been determined for the transient state. If the output of the calculating circuit 60 indicates that the steering wheel 10 is in the steady state, the latch circuit 54 does not apply the drive signal from the circuit 52 to the actuator 26, whereby the same rear-wheel steering angle dr is maintained.

Figure 16:
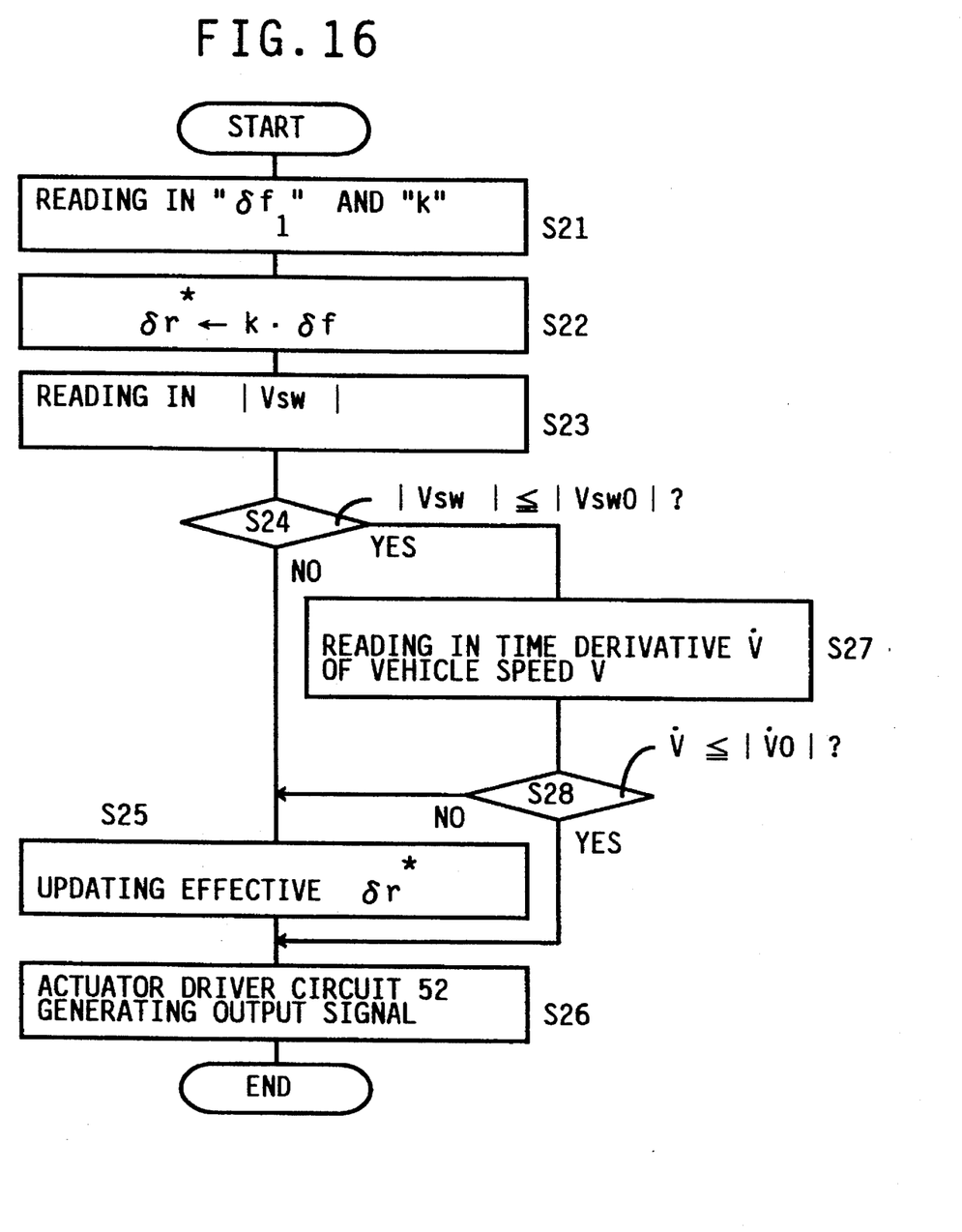
FIG. 16 is a flow chart illustrating an operation according to a still further embodiment of this invention.

The embodiment of FIG. 14 may be modified as illustrated in FIG. 16. This modified embodiment of FIG. 16 is identical to the embodiment of FIG. 14, except for the provision of steps S27 and 28 which are implemented when the steering wheel 10 is in the steady state. Steps S21–S26 in FIG. 16 are identical with steps S11–16 in FIG. 14, respectively. If the steering wheel 10 is in the steady state, that is, if the affirmative decision (YES) is obtained in step S24, step S27 is implemented to read in a time derivative V̇ of the vehicle running speed V. Step S27 is followed by step S28 to determine whether or not the time derivative V̇ is equal to or lower than a predetermined threshold value |V̇o|. If a negative decision (NO) is obtained in step S28, the control flow goes to step S25 to update the desired rear-wheel steering angle δr*. If an affirmative decision (YES) is obtained, that is, if the time derivative V̇0 (rate of change in the vehicle speed V) is lower than the threshold value |V̇o|, the control flow goes to step S26, while skipping step S25, whereby the desired rear-wheel steering angle δr* obtained in the last control cycle is maintained.

In the illustrated embodiment, the actuator 26 consists of one actuator unit to change the rear-wheel steering angle δr. In the modified embodiment as generally illustrated in FIG. 3, however, the actuator may consist of two actuator units. In this case, for example, one of the two actuator units may be operated to establish the desired rear-wheel steering angle δr* as determined by the angle determining means 15 independently of the steering-rate obtaining means 6, when the steering wheel 10 is in the transient state, and the other actuator unit may be operated to change the rear-wheel steering angle dr in the steady state of the steering wheel 10.

While the present invention has been described in detail in its presently preferred embodiments, for illustrative purpose only, it is to be understood that the invention may be embodied with various changes, modifications and improvements, which may occur to those skilled in the art, in the light of the foregoing teachings.

What is claimed is:

1. An apparatus for controlling a steering angle of rear wheels of a motor vehicle, comprising:

front-wheel steering-angle obtaining means for obtaining a steering angle of front wheels of the vehicle;

vehicle-speed obtaining means for obtaining a running speed of the vehicle;

angle determining means for determining a desired value of the steering angle of the rear wheels, on the basis of operating parameters of the vehicle which include the steering angle of said front wheels and said running speed of the vehicle;

an actuator for changing the steering angle of the rear wheels;

actuator driving means for driving said actuator to establish said desired value of the steering angle of said rear wheels;

steering-rate obtaining means for obtaining a steering rate at which a steering wheel of the vehicle is operated by an operator of the vehicle; and control means for controlling a change in the steering angle of the rear wheels which depends on said running speed, such that when said steering angle of the front wheels is not zero, said change is smaller in a steady state of said steering wheel in which said steering rate is not higher than a predetermined threshold value, than in a transient state of the steering wheel in which said steering rate is higher than said threshold value.

2. An apparatus according to claim 1, wherein said angle determining means incorporates said control means, and said control means inhibits said angle determining means from changing said desired value of the steering angle of the rear wheels on the basis of said running speed, when said running speed is not lower than a predetermined threshold value.

3. An apparatus according to claim 1, wherein said angle determining means incorporates said control means, and determines a rear/front steering ratio which is a ratio of the steering angle of said rear wheels to that of said front wheels, on the basis of said operating parameters, to thereby determine said desired value of the steering angle of the rear wheels by multiplying the steering angle of said front wheels by said ratio, said control means including ratio restricting means for restricting a change in said rear/front steering ratio with the steering angle of the front wheels, in said steady state of said steering wheel, said ratio restricting means controlling said actuator driving means so as to establish said desired value of the steering angle of the rear wheels without restriction of said change in said rear/front steering ratio, in said transient state of said steering wheel.

4. An apparatus according to claim 3, wherein said ratio restricting means of said control means restricts said rear/front steering ratio in said steady state, by inhibiting said rear/front steering ratio from being changed with the steering angle of said front wheels, when said running speed is not lower than a predetermined threshold value.

5. An apparatus according to claim 1, wherein said control means uses said desired value of the steering angle of the rear wheels as determined by said angle determining means when said steering wheel is in said transient state, said control means changing said desired value as determined by said angle determining means when said steering wheel is in said steady state.

6. An apparatus according to claim 5, wherein said angle determining means repeats a cycle of determining said desired value of the steering angle of the rear wheels, at a predetermined cycle time, said control means renders effective said desired value of the steering angle of the rear wheels as determined by said angle determining means in a present cycle of determination of said desired value, when said steering wheel is in said transient state, and renders effective said desired value as determined in a preceding cycle of determination, while rendering ineffective said desired value as determined in said present cycle when said steering wheel is brought to said steady state.

7. An apparatus according to claim 5, wherein said control means enables said actuator driving means to establish said desired value of the steering angle of the rear wheels as determined by said angle determining means when said steering wheel is in said transient state, said control means inhibiting said actuator from operating to establish said desired value of the steering angle of the rear wheels as determined by said angle determining means when said steering wheel is in said steady state.

8. An apparatus according to claim 5, wherein said control means uses said desired value of the steering angle of the rear wheels as determined by said angle determining means when said steering wheel is in said steady state and when a time derivative of said running speed of the vehicle is higher than a predetermined threshold value, said control means reducing the change of said desired value of the steering angle of the rear wheels as determined by said angle determining means when said steering wheel is in said steady state and when said time derivative is not higher than said threshold value.

9. An apparatus according to claim 1, wherein said angle determining means comprises a fuzzy controller for determining a consequent variable relating to said desired value of the steering angle of the rear wheels, by fuzzy inference on the basis of antecedent variables as said operating parameters which include said steering rate, said steering angle of the front wheels and said running speed of the vehicle.

10. An apparatus according to claim 1, wherein said angle determining means determines a variable relating to said desired value of the steering angle of the rear wheels, on the basis of at least said steering rate, said steering angle of the front wheels and said running speed of the vehicle.

11. An apparatus according to claim 10, wherein said angle determining means determines as said variable a rear/front steering ratio which is a ratio of the steering angle of the rear wheels to that of the front wheels, and determines said desired value of the steering angle of the rear wheels by multiplying the steering angle of the front wheels by said rear/front steering ratio.

12. An apparatus according to claim 11, wherein said angle determining means determines said variable on the basis of an additional parameter as well as said steering rate, said the steering angle of the front wheels and said running speed of the vehicle, said additional parameter relating to a steering response of the vehicle which represents a sensitivity of a running direction of the vehicle to the steering angle of the front wheels.

13. An apparatus according to claim 12, further comprising setting means controllable by the operator of the vehicle, for setting said additional parameter.

14. An apparatus according to claim 12, wherein said angle determining means includes means for reducing said rear/front steering ratio as said steering response increases.

15. An apparatus according to claim 1, wherein said angle determining means determines said desired angle of the steering angle of the rear wheels such that planes of the rear wheels perpendicular to axes thereof are inclined on one of opposite sides of a neutral position of the rear wheels while planes of the front wheels perpendicular to axes thereof are inclined on the other side of said neutral position, when said running speed of the vehicle is not higher than a predetermined threshold value, and such that said planes of the front and rear wheels are inclined on the same side of said neutral position, when said running speed is higher than said predetermined threshold value.

16. An apparatus according to claim 1, wherein said angle determining means includes ratio determining means for determining a rear/front steering ratio which is a ratio of the steering angle of the rear wheels to that of the front wheels, and determines said desired value of the steering angle of the rear wheels by multiplying the steering angle of the front wheels by said rear/front steering ratio, said angle determining means reducing said rear/front steering ratio with an increase in said running speed of the vehicle.

17. An apparatus according to claim 16, wherein said ratio determining means determines said rear/front steering ratio to be negative when planes of the rear wheels perpendicular to axes thereof are inclined on one of opposite sides of a neutral position of the rear wheels while planes of the front wheel perpendicular to axes thereof are inclined on the other side of said neutral position, said ratio determining means determining said rear/front steering ratio to be positive as long as said running speed of the vehicle is higher than a predetermined threshold value.

18. An apparatus for controlling a steering angle of rear wheels of a motor vehicle, comprising:

front-wheel steering-angle obtaining means for obtaining a steering angle of front wheels of the vehicle;

vehicle-speed obtaining means for obtaining a running speed of the vehicle;

angle determining means for determining a desired value of the steering angle of the rear wheels, on the basis of operating parameters of the vehicle which include the steering angle of the front wheels and said running speed of the vehicle;

an actuator for changing the steering angle of the rear wheels;

actuator driving means for driving said actuator to establish said desired value of the steering angle of said rear wheels;

steering-rate obtaining means for obtaining a steering rate at which a steering wheel of the vehicle is operated by an operator of the vehicle;

control means for controlling a change in the steering angle of the rear wheels which depends on said running speed, such that when the steering angle of the front wheels is not zero, said change is smaller in a steady state of said steering wheel in which said steering rate is not higher than a predetermined threshold value, than in a transient state of the steering wheel in which said steering rate is higher than said threshold value; and said control means comprising inhibiting means for inhibiting said angle determining means from changing said desired value of the steering angle of the rear wheels on the basis of said running speed when said steering wheel is in said steady state.

19. An apparatus according to claim 18, wherein said inhibiting means inhibits said angle determining means from changing said desired value of the steering angle of the rear wheels on the basis of said running speed when said running speed is not lower than a predetermined threshold value.

\* \* \* \* \*